(12) United States Patent
Mittal

(10) Patent No.: US 6,842,613 B2
(45) Date of Patent: Jan. 11, 2005

(54) AUTOMATED SERVICE CONFIGURATION OF MOBILE RADIO STATION DEVICES

(75) Inventor: Gaurav Mittal, San Diego, CA (US)

(73) Assignee: Nokia Corporation, Espoo (FI)

( * ) Notice: Subject to any disclaimer, the term of this patent is extended or adjusted under 35 U.S.C. 154(b) by 352 days.

(21) Appl. No.: 09/943,997

(22) Filed: Aug. 31, 2001

(65) Prior Publication Data

US 2003/0045277 A1 Mar. 6, 2003

(51) Int. Cl.⁷ .......................... H04M 3/42; H04M 3/00; H04M 1/00; H04Q 7/20
(52) U.S. Cl. .................... 455/419; 455/414.3; 455/418; 455/420; 455/550.1; 455/422.1
(58) Field of Search ........................... 455/424.1, 414.3, 455/418, 420, 435.1, 507, 508, 514–517, 550.1, 551, 422.1, 412.2, 419, 423, 424, 425, 466, 412.1; 370/277–278

(56) References Cited

U.S. PATENT DOCUMENTS

| | | | | |
|---|---|---|---|---|
| 5,297,192 A | * | 3/1994 | Gerszberg | 379/59 |
| 5,603,084 A | * | 2/1997 | Henry, Jr. et al. | 455/33.1 |
| 5,881,235 A | | 3/1999 | Mills | |
| 5,930,706 A | * | 7/1999 | Raith | 455/422 |
| 6,029,065 A | * | 2/2000 | Shah | 455/414 |
| 6,134,435 A | | 10/2000 | Zicker et al. | |
| 6,385,451 B1 | * | 5/2002 | Kalliokulju et al. | 455/437 |

* cited by examiner

Primary Examiner—William Trost
Assistant Examiner—Meless N Zewdu (57) ABSTRACT

An apparatus and method is disclosed for configuring a mobile radio station device (e.g., a cellular telephone) when the mobile radio station device or "mobile station" is initially configured for service. The present invention comprises an apparatus and method for downloading initial operational parameters to a mobile station using a radio link. The initial operational parameters are downloaded using a data call connection formed with the mobile station. A data message, such as a Short Message Service (SMS) message, is sent to the mobile station. The data message requests the mobile station to initiate a data call connection with a node-device that contains (or has access to) the initial operational parameters. The mobile station forms a data call connection with the node-device and receives the initial operational parameters.

10 Claims, 6 Drawing Sheets

AUTOMATED SERVICE CONFIGURATION OF MOBILE RADIO STATION DEVICES

CROSS REFERENCE TO RELATED APPLICATION

The present invention is related to an invention disclosed in a U.S. patent application filed on Jul. 30, 2001, application Ser. No. 09/918,394, entitled "Apparatus, and Associated Method, for Providing an Operation Parameter to a Mobile Station of a Radio Communication Station." The related patent application is commonly assigned to the assignee of the present invention. The disclosures of the related patent application are hereby incorporated by reference for all purposes as if fully set forth herein.

FIELD OF THE INVENTION

The present invention relates generally to configuring a mobile radio station device (e.g., a cellular telephone) when the mobile radio station device is initially placed in service.

BACKGROUND OF THE INVENTION

A communication system is used by a sending party to send data to a receiving party. The data is sent by a sending station upon a communication channel for delivery to a receiving station. Through appropriate selection of the communication channel, the data may be sent from the sending station to the receiving station, even when the sending station and the receiving station are located far from each other.

Advancements in communication technologies have permitted the development and implementation of many different types of communication systems for sending data between a sending station and a receiving station. Improvements in communication technologies continue to make possible the transmission of increasingly large amounts of data at increasingly higher data transmission rates.

A radio communication system is an example of a communication system in which communication technologies have been applied to increase data communication speed and capacity. In a radio communication system, communication channels formed between the sending stations and the receiving stations are defined upon radio links that extend between the sending stations and the receiving stations.

Wire line connections are not required to interconnect the sending stations and the receiving stations in a radio communication system. In a conventional, wire line communication system, in contrast, a wire line connection in required upon which to define communication channels which are used to communicate the data between the sending stations and the receiving stations. Because a wire line is not needed in a radio communication system, a radio communication system inherently provides increased communication mobility, relative to a fixed conventional wire line communication system. Radio communication systems are therefore regularly used in mobile applications to provide communications between locations where the use of wire line connections would be inconvenient or impractical.

A cellular communication system is a type of radio communication system. Cellular communication systems have been installed throughout large geographical areas of the world. A cellular communication system is operated by an operator, sometimes referred to as a service provider. Subscribers are authorized to communicate over the cellular communication system after purchasing a service subscription.

A cellular communication system is designed, constructed, and operated pursuant to an operating specification. Various types of operating specifications have been promulgated. As advancements in communications technologies permit, the operating standards are amended to incorporate new and improved features. New standards are promulgated to set the operational standards of new types of cellular communication systems.

When a mobile station such as a cellular telephone is initially placed in operation it must first be programmed or "configured." The initial configuration procedure involves placing values of operational parameters within the mobile station. When a new mobile station is to be initially configured the mobile station is taken to a service center where the initial values of operational parameters are provided to the mobile station.

Physically carrying a mobile station to a service center for initial configuration is typically an inconvenience to the user of the mobile station. This is particularly true if the service center is inconveniently located for the user. In addition, the service provider must maintain and operate a service center and hire service center personnel to initially configure each new mobile station for service. The staffing and operation of a service center for configuring mobile stations can be a significant expense for the service provider.

It would therefore be desirable to have an apparatus and method that would allow a mobile station to be initially configured without physically carrying the mobile station to a service center.

It would also be desirable to have an apparatus and method that would allow a mobile station to be initially configured without having service center personnel personally configure the mobile station.

It would also be desirable to decrease the cost of operation of a mobile station service center by providing an apparatus and method that would allow a mobile station to be initially configured remotely through a radio link.

SUMMARY OF THE INVENTION

The present invention provides an apparatus and method for initially configuring a mobile radio station device such as a cellular telephone.

Through the operation of an advantageous embodiment of the present invention, an apparatus and method are provided for downloading initial operating parameters to a mobile station using a radio link. The initial operating parameters are downloaded pursuant to a data call connection formed with the mobile station. When the initial operational parameters are to be downloaded, a data message, such as a Short Message Service (SMS) message, is sent to the mobile station requesting the mobile station to initiate a data call connection with a node-device that contains (or has access to) the initial operational parameters. Responsive to the data message, the mobile station forms a data call connection with the node-device and receives the initial operational parameters.

In one advantageous embodiment of the present invention, an apparatus and method are provided for communicating initial operational parameters to a new mobile station when the new mobile station is to be activated. The initial operational parameters are stored in (or otherwise accessible by) a server associated with the communication system in which the mobile station is operable. The server forms a node-device that is connected to a packet data network, such as the Internet backbone. The initial operational parameters may be provided to the packet data network through a user actuation device coupled to the server.

The communication system provides a data messaging service, such as Short Message Service (SMS) messaging provided in a Global System for Mobile Communications (GSM) communication system. When initial operational parameters are to be provided to the new mobile station, the server generates an initiation signal that is routed to a data message service center that is also coupled to the packet data network. The initiation signal initiates a downloading procedure that downloads values of the initial operational parameters for the new mobile station.

After the initiation signal has been delivered to the data message service center, the data message service center causes an initial operational parameters request signal to be generated. The initial operational parameters request signal forms a data message, such as an SMS message, that is sent to the mobile station. The initial operational parameters request signal requests the mobile station to request initiation of the downloading procedure.

In an alternate advantageous embodiment of the present invention, the mobile station detects the initial operational parameters request signal that is sent to the mobile station. The initial operational parameters request signal includes an indication of the identity of the server forming the node-device that contains the initial operational parameters that are to be downloaded to the new mobile station. For example, the server may be identified by an Internet Protocol (IP) address. The IP address of the server may be contained in the initial operational parameters request signal.

The mobile station, in response to the detection of the initial operational parameters request signal, initiates a data message request to initiate a data connection between the mobile station and the server that contains the initial operational parameters that are to be downloaded to the new mobile station.

In yet another advantageous embodiment of the present invention, the server is operable, in response to the detection of the request by the mobile station to initiate the data connection, to complete the data connection between the server and the mobile station. After the data call connection has been formed, the initial operational parameters are downloaded from the server to the mobile station.

A determination is made by the mobile station whether the initial operational parameters have been successfully downloaded. If the initial operational parameters have been successfully downloaded, then the mobile station sends the server an indication of successful delivery of the initial operational parameters. If the initial operational parameters have not been successfully downloaded, then the mobile station sends the server an indication of an unsuccessful delivery of the initial operational parameters. Upon the successful completion of the downloading of the initial operational parameters to the mobile station, the data call connection is terminated.

Because a data message, such as an SMS message, is sent to the mobile station to initiate downloading of the initial operational parameters to the mobile station, and because a data call connection is formed to effectuate the downloading of the initial operational parameters, the mobile station need not be physically delivered to a service center for an initial configuration of initial operational parameters. The user of the mobile station is not inconvenienced by a trip to a service center to initially configure the mobile station. The service provider saves costs associated with having service center personnel perform the initial configuration of the mobile station.

The apparatus and method of the present invention comprise a network part that is capable of communicating to a mobile station data messages that are generated at a data message service center. A new mobile station is operable using initial operational parameters. The apparatus and method of the present invention are capable of downloading values defining the initial operational parameters for a new mobile station.

An initial operational parameters initiation signal generator within the server is capable of receiving a request from the mobile station to download values of the initial operational parameters to the mobile station. The initial operational parameters initiation signal generator generates an initiation signal directed to the data message service center to initiate downloading of the values of the initial operational parameters for the mobile station. An initial operational parameters request signal generator is located within the data message service center. The initial operational parameters request signal generator generates a data message request for communication to the mobile station. The data message request requests initiation of the downloading of the initial operational parameters.

It is an object of the present invention to provide an apparatus and method for initially configuring a mobile station remotely through a radio link.

It is also an object of the present invention to provide an apparatus and method for initially configuring a mobile station remotely through a radio link without input from a user of the mobile station.

It is another object of the present invention to provide an apparatus and method for initially configuring a mobile station remotely through a radio link only when authorization from a user of the mobile station has been received.

It is a further object of the present invention to provide an apparatus and method for initially configuring different types of mobile radio station devices.

Other objects and advantages of the invention will become apparent as the description proceeds.

The foregoing has outlined rather broadly the features and technical advantages of the present invention so that those skilled in the art may better understand the Detailed Description of the Invention that follows. Additional features and advantages of the invention will be described hereinafter that form the subject matter of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the Detailed Description of the Invention, it may be advantageous to set forth definitions of certain words and phrases used throughout this patent document: The terms "include" and "comprise" and derivatives thereof, mean inclusion without limitation, the term "or" is inclusive, meaning "and/or"; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, to bound to or with, have, have a property of, or the like; and the term "controller," "processor," or "apparatus" means any device, system or part thereof that controls at least one operation. Such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document. Those of ordinary skill should understand that in many instances (if not in most instances), such definitions apply to prior uses, as well as future uses of such defined words and phrases.

BRIEF DESCRIPTION OF THE DRAWINGS

For a more complete understanding of the present invention, and the advantages thereof, reference is now made to the following descriptions taking in conjunction with the accompanying drawings, wherein like numbers designate like objects, and in which.

DETAILED DESCRIPTION OF THE INVENTION

FIGS. 1 through 6, discussed below, and the various embodiments set forth in this patent document to describe the principles of the apparatus and method of the present invention are by way of illustration only and should not be construed in any way to limit the scope of the invention. The apparatus and method of the present invention will be described as an apparatus and method for providing initial operational parameters to a cellular telephone. It is important to realize that the apparatus and method of the present invention is not limited to a cellular telephone. Those skilled in the art will readily understand that the principles of the present invention may also be successfully applied in any type of mobile station, including, without limitation, vending machines, and any type of radio communication equipment that utilizes a Global System for Mobile Communications (GSM) module or a Code Division Multiple Access (CDMA) chipset. The term "mobile station" is used to refer to these types of equipment. In the descriptions that follow, a cellular telephone is employed as an illustration of a mobile station.

Figure 1:
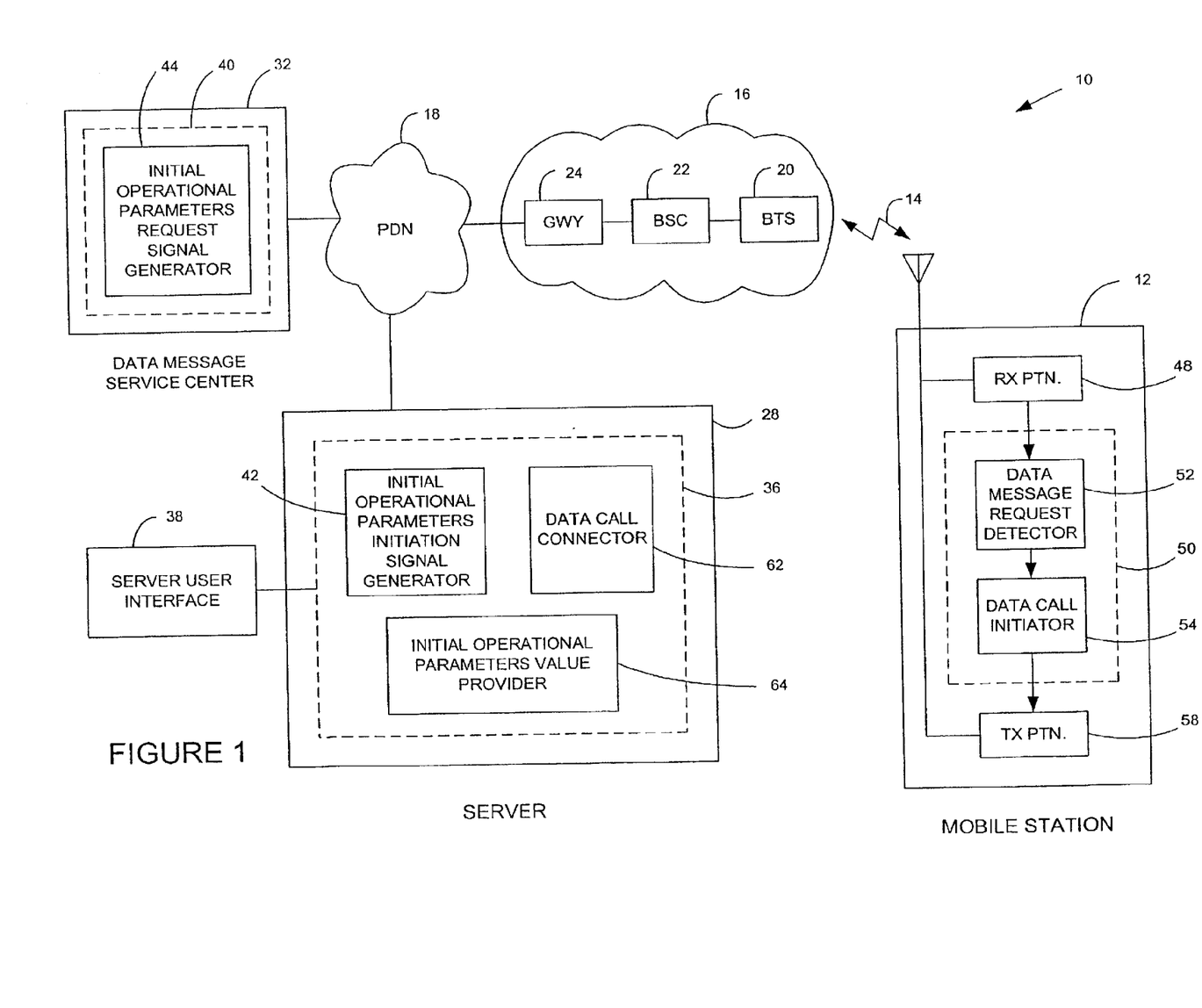
FIG. 1 is a block diagram showing a communication system comprising an advantageous embodiment of the present invention.

FIG. 1 is a block diagram showing a communication system 10 comprising an advantageous embodiment of the present invention. Communication system 10 provides an apparatus and method for communicating with a mobile station 12. In one advantageous embodiment of the present invention mobile station 12 comprises a cellular telephone. Data is communicated to and from mobile station 12 through radio channels in a radio link 14. The embodiment of communication system 10 shown in FIG. 1 comprises a Global System for Mobile Communications (GSM) cellular communication system. The GSM system provides Short Message Service (SMS) messaging. Although the following description describes the operation of an embodiment of the present invention in which communication system 10 comprises a GSM cellular communication system, it is understood that the apparatus and method of the present invention may also be used in other types of communication systems.

Communication system 10 comprises a network part that comprises a radio access network 16 and a packet data network (PDN) 18. Radio access network 16 comprises a plurality of base transceiver stations (BTSs), of which one base transceiver station 20 is shown in FIG. 1. Each of the plurality of base transceiver stations defines a coverage area, referred to as a cell. When a mobile station, such as mobile station 12, is positioned within a cell by a base transceiver station, such as base transceiver station 20, communications with the mobile station are generally enabled by the base transceiver station that defines the cell within which the mobile station is positioned.

The base transceiver station 20 is coupled to a base station controller (BSC) 22. Typically, a group of base transceiver stations are coupled to a single base station controller. The base station controller is capable of performing various control functions that control the operation of the base transceiver stations that are coupled to the base station controller. Operations that may be controlled by the base station controller include, for example, channel allocations for communications sessions with mobile stations positioned within the cells defined by the base transceiver stations.

Base station controller 22 is coupled to gateway (GWY) 24. Gateway (GWY) 24 is coupled to packet data network 18.

Communication devices forming nodes are coupled to the packet data network 18. After the communication devices have been suitably connected to packet data network 18, the communications devices communicate packet data by way of packet data network 18. In the embodiment shown in FIG. 1, a computer server 28 is connected to packet data network 18. A data message service center 32 is also coupled to packet data network 18. Data message service center 32 comprises a Short Message Service (SMS) service center. Data message service center 32 is capable of generating, or otherwise routing, data messages (here, SMS messages) to and from mobile station 12. Other types of devices connected to packet data network 18 are capable of communicating through packet data network 18 to and from mobile station 12 by way of radio access network 16 and radio links 14.

As noted above, mobile station 12 operates using operational parameters stored in mobile station 12. When mobile station 12 is initially placed in operation it must first be programmed or "configured." The initial configuration procedure involves placing an initial set of values of operational parameters within mobile station 12.

Communication system 10 comprises an advantageous embodiment of the present invention for remotely downloading and installing initial operational parameters in mobile station 12 by way of radio link 14. This feature makes it unnecessary for a user of mobile station 12 to physically take mobile station 12 to a service center for the initial configuration procedure.

Accordingly, server 28 includes an apparatus 36 of an advantageous embodiment of the present invention for receiving indications of input from a server user through server user interface 38. Server user interface 38 may take the form of a computer keyboard coupled to server 28 in a conventional manner. The elements of apparatus 36 are represented as functional blocks in FIG. 1. The elements of apparatus 36 may be implemented in any desired manner, for example, by algorithms that are executed by processing circuitry within server 28.

Apparatus 36 comprises an initial operational parameters initiation signal generator 42 that operates in response to an appropriate server user input from server user interface 38, or other selection criteria, to generate an initiation signal. The initiation signal is routed through packet data network 18 to data message service center 32. The data message service center 32 comprises an apparatus 40 of an advantageous embodiment of the present invention. Apparatus 40 comprises an initial operational parameters request signal generator 44. Initial operational parameters request signal generator 44 is represented as a functional block in FIG. 1. Initial operational parameters request signal generator 44 may be implemented in any desired manner, for example, by algorithms that are executed by processing circuitry within data message service center 32.

Initial operational parameters request signal generator 44 is capable of generating a data message request for communication through packet data network 18, through radio access network 16, and through radio channels within radio link 14 to be received at mobile station 12. Mobile station 12 comprises a receive portion 48 coupled to receive the data message request generated by data message service center 32 and communicated to mobile station 12.

Mobile station 12 further comprises apparatus 50 of an advantageous embodiment of the present invention. In the advantageous embodiment shown in FIG. 1, apparatus 50 comprises a data message request detector 52 and a data call initiator and status reporter 54. The elements of apparatus 50 are represented as functional blocks in FIG. 1. The elements of apparatus 50 may be implemented in any desired manner, for example, by algorithms that are executed by processing circuitry within mobile station 12.

Data message request detector 52 detects indications of a data message request received at the receive portion 48 of mobile station 12. When a data message request is detected an indication is provided to data call initiator and status reporter 54. When data message request detector 52 detects a data message request, data call initiator and status reporter 54 initiates a data call.

Data call initiator and status reporter 54 is coupled to a transmit portion 58 of mobile station 12. The transmit portion 58 transmits a data call connection initiation request to form a data call connection between mobile station 12 and server 28. The signal generated by the transmit portion 58 of mobile station 12 is sent by radio link 14 through radio access network 16, through packet data network 18, and is delivered to server 28.

Apparatus 36 within server 28 further comprises a data call connector 62. Data call connector 62 is capable of responding to the detection within server 28 of the signal generated and sent by the transmit portion 58 of mobile station 12. Data call connector 62 then originates a data call connection between mobile station 12 and server 28. After the data call connection has been formed, initial operational parameters are downloaded from server 28 to mobile station 12 pursuant to the data call connection.

Apparatus 36 further comprises an initial operational parameters value provider 64. Initial operational parameters that are to be downloaded to mobile station 12 are stored in (or otherwise accessible by) initial operational parameters value provider 64. Initial operational parameters may be stored in memory locations of server 28. Initial operational parameters may also be provided to server 28 by a server user through server user interface 38.

After the initial operational parameters have been downloaded to mobile station 12, mobile station 12 may use the initial operational parameters in subsequent communications within communication system 10. Data call initiator and status reporter 54 is capable of determining whether the initial operational parameters have been successfully downloaded. Data call initiator and status reporter 54 is also capable of generating and sending a report to server 28 to indicate a successful downloading of the initial operational parameters. After the initial operational parameters have been successfully downloaded to mobile station 12, the data call connection between server 28 and mobile station 12 is terminated. The data call connection may be terminated by an instruction from data call connector 62.

Figure 2:
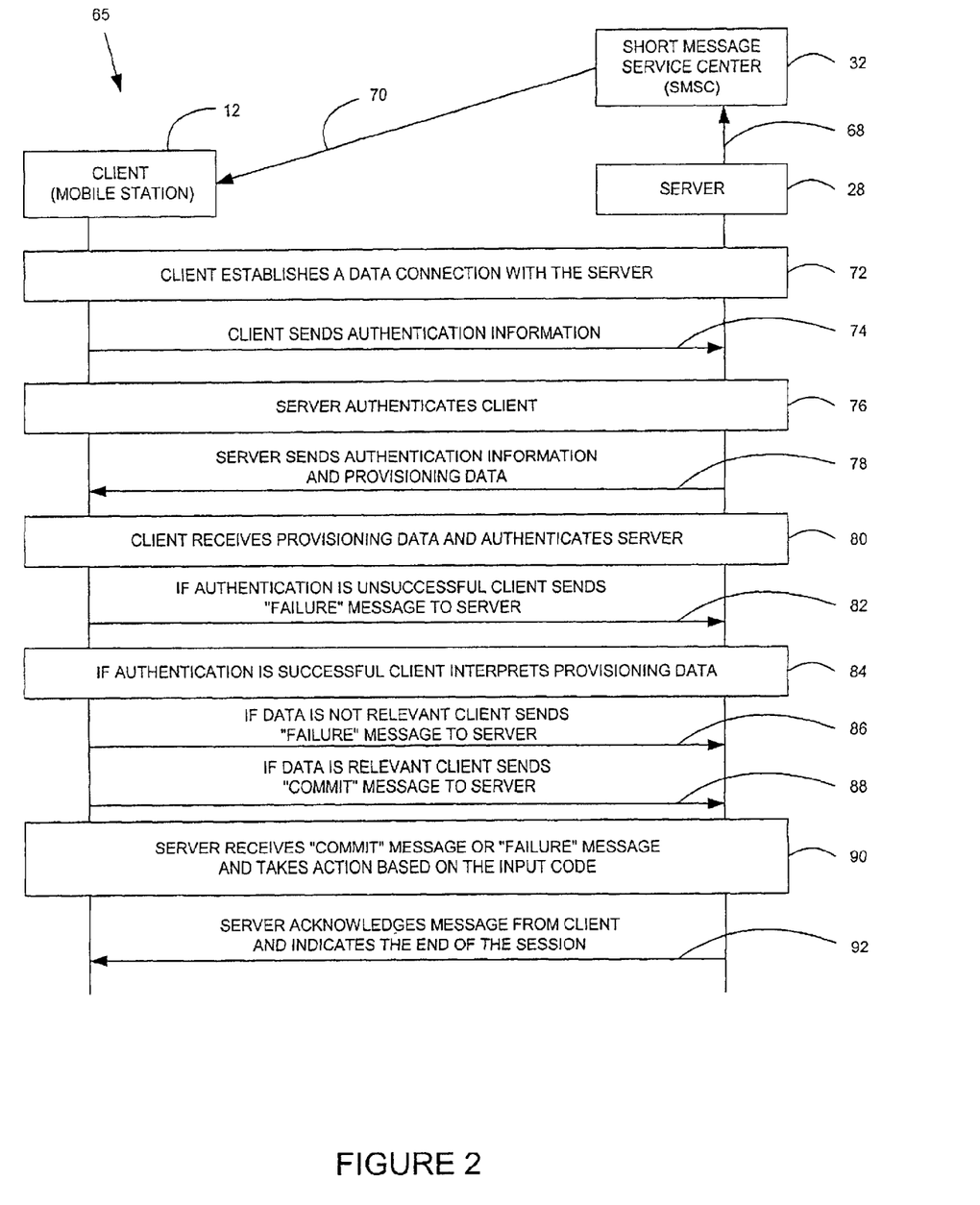
FIG. 2 is a message sequence diagram representing signaling generated by various elements of the communication system illustrated in FIG. 1 during the operation of an advantageous embodiment of the present invention.

FIG. 2 is a message sequence diagram representing signaling generated by various elements of communication system 10 during the operation of an advantageous embodiment of the present invention. The message sequence diagram of FIG. 2 is generally denoted with reference numeral 65.

Server 28 generates a download parameter initiation signal that is denoted by reference numeral 68. The download parameter initiation signal is routed to the Short Message Service Center (SMSC) in data message service center 32. Upon detecting the initiation signal, the Short Message Service Center (SMSC) generates an SMS message to form a data message request, denoted by reference numeral 70, that is communicated to mobile station 12.

Mobile station 12 (also referred to as the "client") initiates a data connection, represented by block 72, between mobile station 12 and server 28. Client authentication information, denoted by reference numeral 74, is sent by mobile station 12 to server 28.

Server 28 uses an authentication procedure to authenticate mobile station 12. The authentication of mobile station 12 by server 28 is represented by block 76. Server 28 then sends server authentication and provisioning data, denoted by reference numeral 78, to mobile station 12. The term "provisioning data" includes the initial operational parameters for configuring mobile station 12.

Mobile station 12 receives the provisioning data and server authentication information from server 28. Mobile station 12 then uses an authentication procedure to authenticate server 28. The receipt by mobile station 12 of the provisioning data and server authentication information from server 28 and the authentication of server 28 by mobile station 12 is represented by block 80.

If the authentication of server 28 is unsuccessful, then mobile station 12 sends a "failure" message to server 28 indicating that mobile station 12 could not authenticate server 28. The sending of the "failure" message advising of the failure to authenticate server 28 is denoted by reference numeral 82. If the authentication of server 28 is successful, then mobile station 12 interprets the provisioning data (i.e., the initial operational parameters). The interpretation of the provisioning data by mobile station 12 is represented by block 84.

If mobile station 12 determines that the provisioning data is not relevant, then mobile station 12 sends a "failure"

message to server 28 indicating that mobile station 12 did not find the provisioning data to be relevant. The sending of the "failure" message advising of the failure to find relevant provisioning data is denoted by reference numeral 86.

If mobile station 12 determines that the provisioning data is relevant, then mobile station 12 sends a "commit" message to server 28 indicating that mobile station 12 has determines that the provisioning data is relevant. The sending of the "commit" message advising of the success in finding relevant provisioning data is denoted by reference numeral 88. The "commit" message indicates that mobile station 12 has received the initial operating parameters in the provisioning data.

Server 28 receives either the "failure" message 86 or the "commit" message 88. Server 28 then takes action based on the input code received by server 28. If server 28 receives the "failure" message, then server 28 notes that mobile station 12 has not received initial operating parameters. If server 28 receives the "commit" message, then server 28 notes that mobile station 12 has received the initial operating parameters in the provisioning data. The receipt by server 28 of the "failure" message 86 or the "commit" message 88 and the action taken by server 28 is represented by block 90.

Lastly, as denoted by reference numeral 92, server 28 acknowledges the message generated by mobile station 12, indicates the end of the communication session, and terminates the data call connection.

Figure 3:
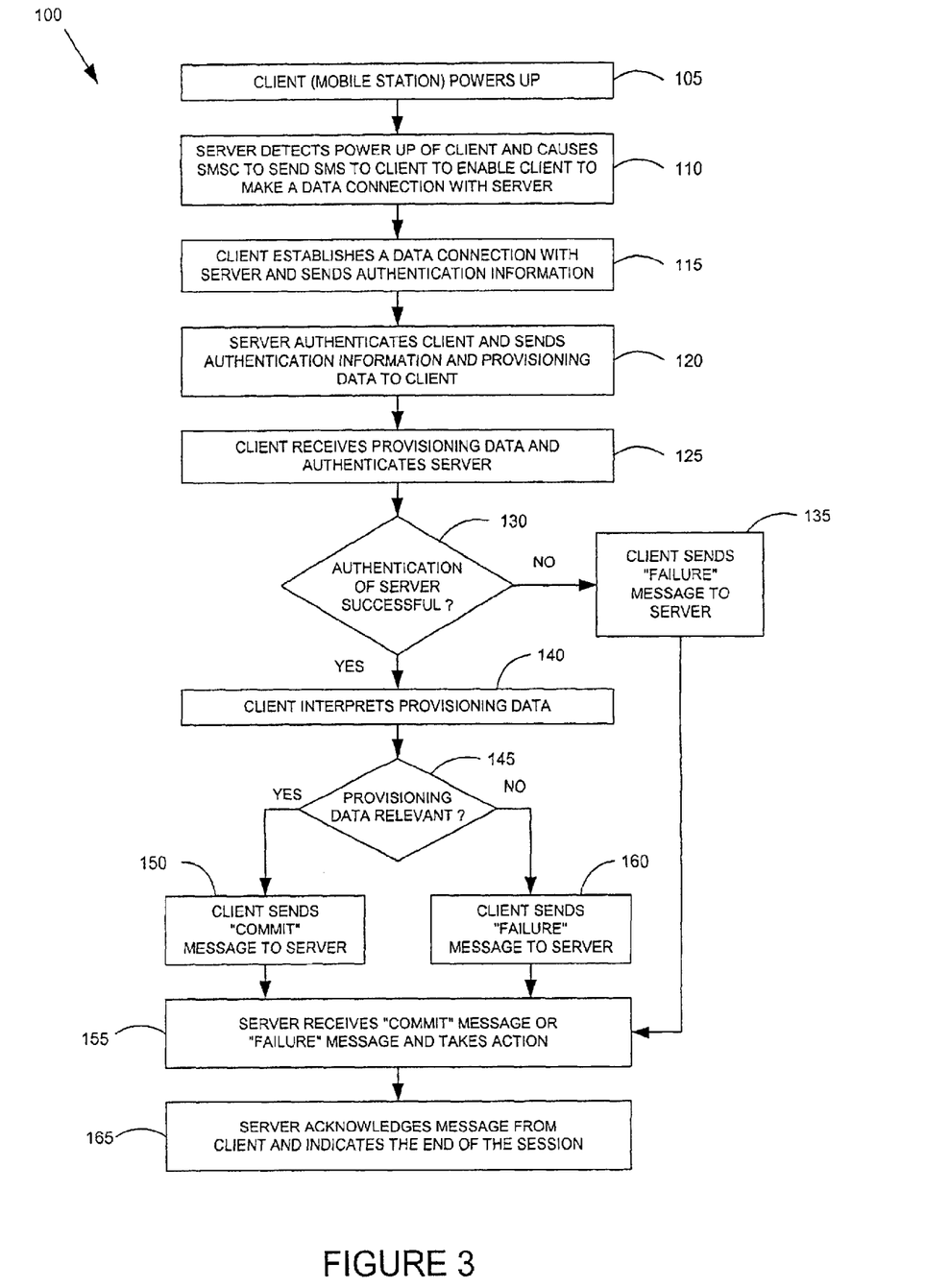
FIG. 3 is a flow diagram showing the method steps of an advantageous embodiment of the present invention illustrated in the message sequence diagram of FIG. 2.

FIG. 3 is a flow diagram showing the method steps of an advantageous embodiment of the method of the present invention illustrated in the message sequence diagram of FIG. 2. The steps of the method are generally denoted with reference numeral 100. Mobile station 12 communicates in communication system 10 having a network part that communicates data messages that are generated at data message service center 32.

First, mobile station 12 (also referred to as the "client") powers up (step 105). Server 28 detects the power up status of mobile station 12 and causes the Short Message Service Center (SMSC) in data message service center 32 to generate and send a Short Message Service (SMS) message to mobile station 12 to enable mobile station 12 to make a data connection with server 28 (step 110). Mobile station 12 then establishes a data connection with server 28 and sends client authentication information to server 28 (step 115).

Server 28 then authenticates mobile station 12 and sends server authentication information and provisioning data (i.e., initial operational parameters) to mobile station 12 (step 120). Mobile station 12 receives the server authentication and provisioning data and authenticates server 28 (step 125).

Mobile station 12 then makes a determination whether the authentication of server 28 was successful (decision step 130). If the authentication of server 28 was unsuccessful, mobile station 12 sends a "failure" message to server 28 (step 135) indicating a failure to authenticate server 28. Control then passes to step 155. If the authentication of server 28 was successful, mobile station 12 interprets the provisioning data (step 140).

Mobile station 12 then makes a determination whether the provisioning data was relevant (decision step 145). If the provisioning data was relevant, then mobile station 12 sends a "commit" message to server 28 (step 150) and control then passes to step 155. If the provisioning data was not relevant, then mobile station 12 sends a "failure" message to server 28 (step 160) and control then passes to step 155. As previously indicated, a "commit" message means that mobile station 12 has received the initial operating parameters in the provisioning data.

Server 28 receives either a "commit" message from step 150, or a "failure" message from step 160, or a "failure" message from step 135 (step 155). Server 28 then takes appropriate action depending upon the message received by server 28 (step 155). Lastly, server 28 acknowledges the message generated by mobile station 12, indicates the end of the communication session, and terminates the data call connection (step 165).

In this manner the initial operational parameters are downloaded to mobile station 12 remotely by communication through packet data network 18, radio access network 16, and radio link 14. There is no need for a user to physically carry mobile station 12 to a service center to receive an initial configuration of operational parameters.

Figure 4:
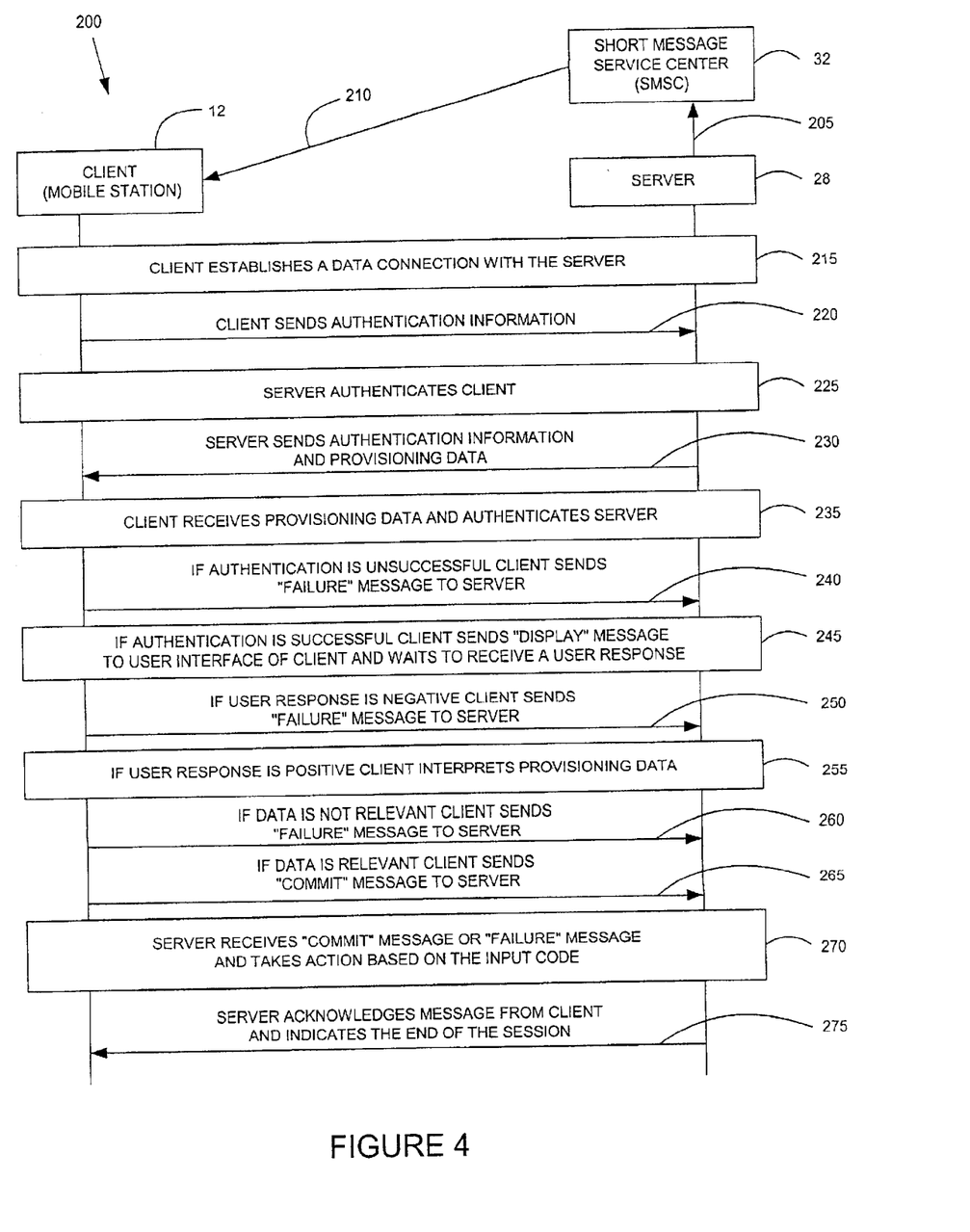
FIG. 4 is a message sequence diagram representing signaling generated by various elements of the communication system illustrated in FIG. 1 during the operation of an alternate advantageous embodiment of the present invention.

FIG. 4 is a message sequence diagram representing signaling generated by various elements of communication system 10 during the operation of an alternate advantageous embodiment of the present invention. The message sequence diagram of FIG. 4 is generally denoted with reference numeral 200.

Server 28 generates a download parameter initiation signal that is denoted by reference numeral 205. The download parameter initiation signal is routed to the Short Message Service Center (SMSC) in data message service center 32. Upon detecting the initiation signal, the Short Message Service Center (SMSC) generates an SMS message to form a data message request, denoted by reference numeral 210, that is communicated to mobile station 12.

Mobile station 12 (also referred to as the "client") initiates a data connection, represented by block 215, between mobile station 12 and server 28. Client authentication information, denoted by reference numeral 220, is sent by mobile station 12 to server 28.

Server 28 uses an authentication procedure to authenticate mobile station 12. The authentication of mobile station 12 by server 28 is represented by block 225. Server 28 then sends server authentication and provisioning data, denoted by reference numeral 230, to mobile station 12. The term "provisioning data" includes the initial operational parameters for configuring mobile station 12.

Mobile station 12 receives the provisioning data and server authentication information from server 28. Mobile station 12 then uses an authentication procedure to authenticate server 28. The receipt by mobile station 12 of the provisioning data and server authentication information from server 28 and the authentication of server 28 by mobile station 12 is represented by block 235.

If the authentication of server 28 is unsuccessful, then mobile station 12 sends a "failure" message to server 28 indicating that mobile station 12 could not authenticate server 28. The sending of the "failure" message advising of the failure to authenticate server 28 is denoted by reference numeral 240.

If the authentication of server 28 is successful, then mobile station 12 sends a "display" message to a user interface (not shown) of mobile station 12. The "display" message asks the user of mobile station 12 for a response. For example, the "display" message may ask the user of mobile station 12 if he or she now wishes to initially configure mobile station 12. After mobile station 12 sends the "display" message, mobile station 12 waits a predetermined period of time for a user response. The sending of the "display" message and the waiting for a user response is represented by block 245.

If the user of mobile station 12 does not respond within the predetermined period of time, the response is said to be "negative." Mobile station 12 then sends a "failure" message to server 28 indicating that mobile station 12 did not receive a user response to the "display" message. The sending of the "failure" message advising of the failure to receive a user response is denoted by reference numeral 250.

If the user of mobile station 12 does respond within the predetermined period of time, the response is said to be "positive." If the user response is "positive", then mobile station 12 interprets the provisioning data (i.e., the initial operational parameters). The interpretation of the provisioning data by mobile station 12 is represented by block 255.

If mobile station 12 determines that the provisioning data is not relevant, then mobile station 12 sends a "failure" message to server 28 indicating that mobile station 12 did not find the provisioning data to be relevant. The sending of the "failure" message advising of the failure to find relevant provisioning data is denoted by reference numeral 260.

If mobile station 12 determines that the provisioning data is relevant, then mobile station 12 sends a "commit" message to server 28 indicating that mobile station 12 has determines that the provisioning data is relevant. The sending of the "commit" message advising of the success in finding relevant provisioning data is denoted by reference numeral 265. The "commit" message indicates that mobile station 12 has received the initial operating parameters in the provisioning data.

Server 28 receives either the "failure" message 260 or the "commit" message 265. Server 28 then takes action based on the input code received by server 28. If server 28 receives the "failure" message, then server 28 notes that mobile station 12 has not received initial operating parameters. If server 28 receives the "commit" message, then server 28 notes that mobile station 12 has received the initial operating parameters in the provisioning data. The receipt by server 28 of the "failure" message 260 or the "commit" message 265 and the action taken by server 28 is represented by block 270.

Lastly, as denoted by reference numeral 275, server 28 acknowledges the message generated by mobile station 12, indicates the end of the communication session, and terminates the data call connection.

Figure 5:
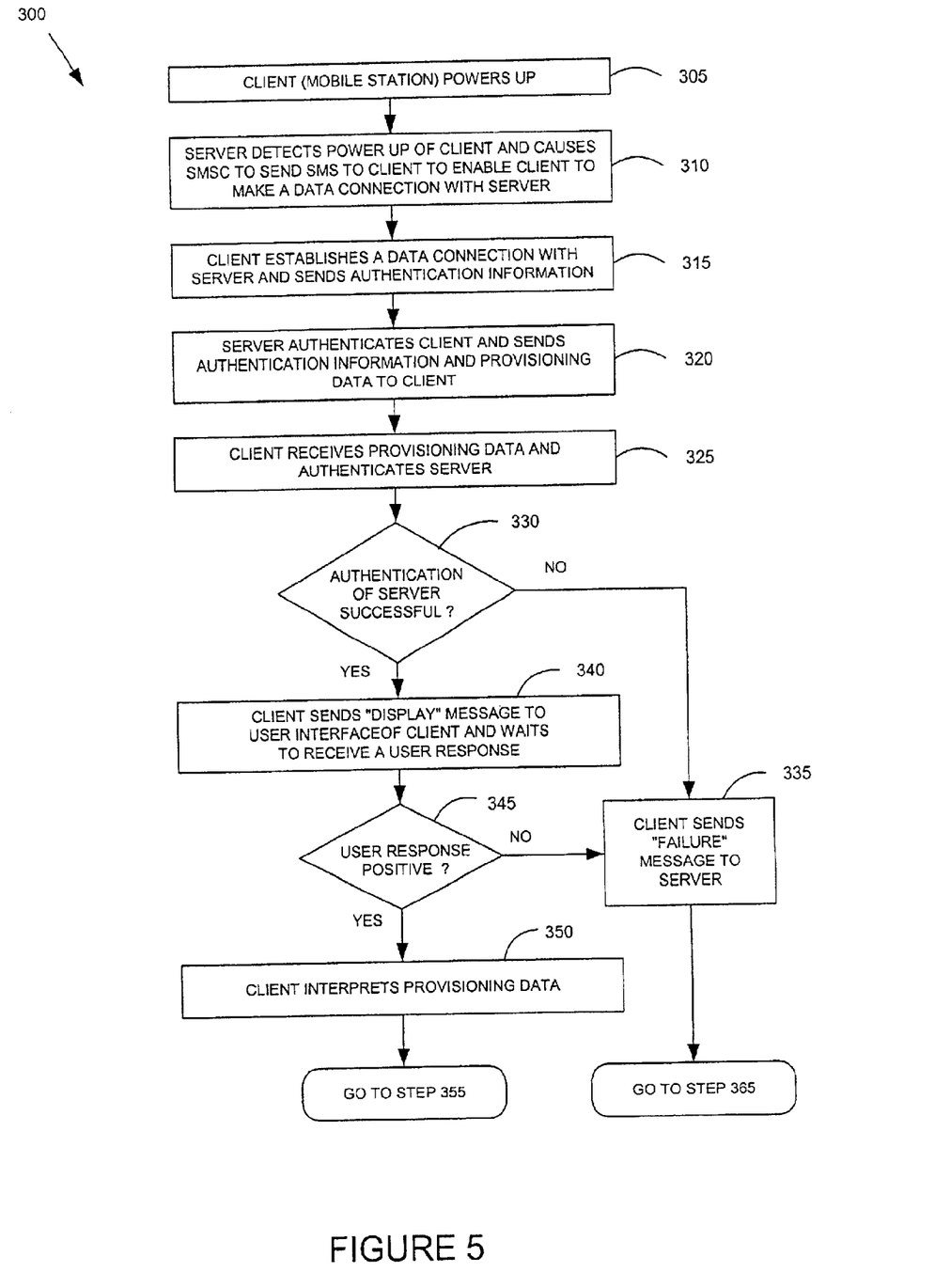
FIG. 5 is a first portion of a flow diagram showing the method steps of the alternate advantageous embodiment of the present invention illustrated in the message sequence diagram of FIG. 4.
Figure 6:
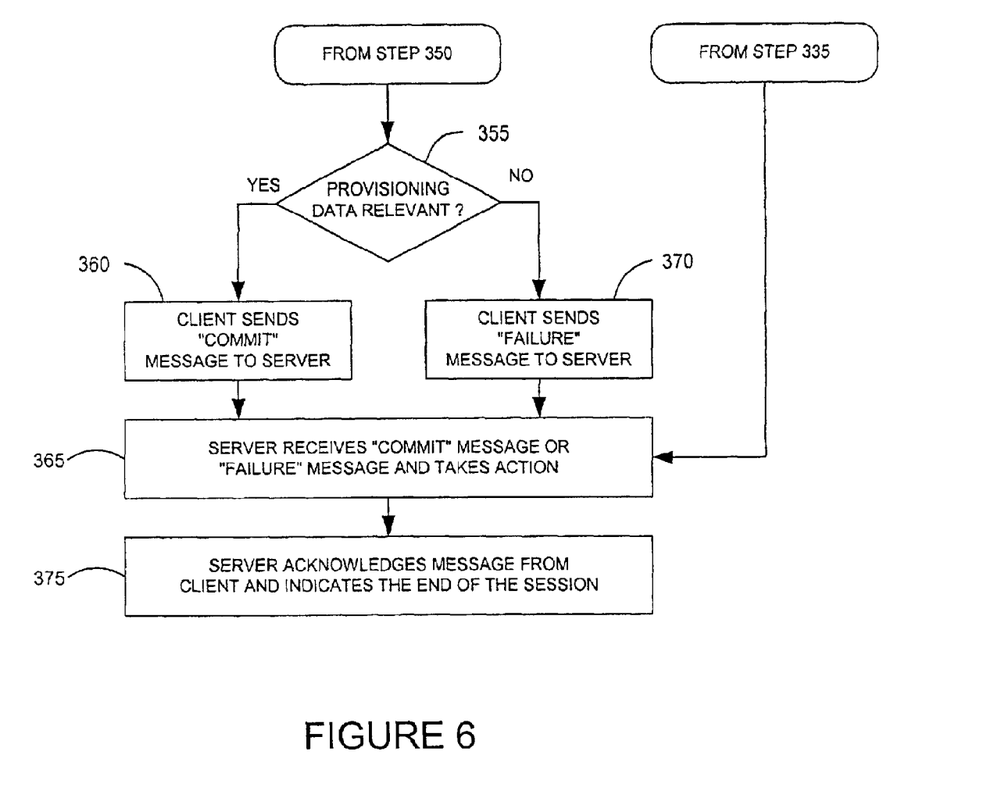
FIG. 6 is a second portion of a flow diagram showing the method steps of the alternate advantageous embodiment of the present invention illustrated in the message sequence diagram of FIG. 4.

FIG. 5 and FIG. 6 are flow diagrams showing the method steps of an advantageous embodiment of the method of the present invention illustrated in the message sequence diagram of FIG. 4. The steps of the method are generally denoted with reference numeral 300. Mobile station 12 communicates in communication system 10 having a network part that communicates data messages that are generated at data message service center 32.

First, mobile station 12 (also referred to as the "client") powers up (step 305). Server 28 detects the power up status of mobile station 12 and causes the Short Message Service Center (SMSC) in data message service center 32 to generate and send a Short Message Service (SMS) message to mobile station 12 to enable mobile station 12 to make a data connection with server 28 (step 310). Mobile station 12 then establishes a data connection with server 28 and sends client authentication information to server 28 (step 315).

Server 28 then authenticates mobile station 12 and sends server authentication information and provisioning data (i.e., initial operational parameters) to mobile station 12 (step 320). Mobile station 12 receives the server authentication and provisioning data and authenticates server 28 (step 325).

Mobile station 12 then makes a determination whether the authentication of server 28 is successful (decision step 330). If the authentication of server 28 is unsuccessful, mobile station 12 sends a "failure" message to server 28 (step 335) indicating a failure to authenticate server 28. Control then passes to step 365.

If the authentication of server 28 is successful, mobile station 12 sends a "display" message to the user interface (not shown) of mobile station 12 and waits to receive a user response (step 340). As previously indicated, the "display" message asks the user of mobile station 12 for a response.

Mobile station 12 then determines whether the user response is "positive" or "negative" (decision step 345). If the user response is "negative", then mobile station 12 sends a "failure" message to server 28 (step 335) indicating a failure to receive a user response. Control then passes to step 365. If the user response is "positive", then mobile station 12 interprets the provisioning data (i.e., the initial operational parameters) (step 350).

Mobile station 12 then makes a determination whether the provisioning data was relevant (decision step 355). If the provisioning data was relevant, then mobile station 12 sends a "commit" message to server 28 (step 360) and control then passes to step 365. If the provisioning data was not relevant, then mobile station 12 sends a "failure" message to server 28 (step 370) and control then passes to step 365. As previously indicated, a "commit" message means that mobile station 12 has received the initial operating parameters in the provisioning data.

Server 28 receives either a "commit" message from step 360, or a "failure" message from step 370, or a "failure" message from step 335 (step 365). Server 28 then takes appropriate action depending upon the message received by server 28 (step 365). Lastly, server 28 acknowledges the message generated by mobile station 12, indicates the end of the communication session, and terminates the data call connection (step 375).

In this alternate advantageous embodiment of the present invention, the user of mobile station 12 expressly authorizes the downloading of the initial operational parameters to mobile station 12. If mobile station 12 receives a "positive" response from the user, then the initial operational parameters are remotely downloaded by communication through packet data network 18, radio access network 16, and radio link 14. However, if mobile station 12 does not receive a "positive" response from the user, then the initial operational parameters are not downloaded. Mobile station 12 will not be configured until the user of mobile station 12 expressly authorizes an initial configuration to be carried out.

The above examples and description have been provided only for the purpose of illustration, and are not intended to limit the invention in any way. As will be appreciated by the skilled person, the invention can be carried out in a great variety of ways, employing more than one technique from those described above, all without exceeding the scope of the invention.

What is claimed is:

1. A method for a radio communication system having a network part that is capable of communicating data messages that are generated at a data message service center to a mobile station operable in a radio communication system, the mobile station operable pursuant to at least one operational parameter, said method for downloading initial operational parameters to said mobile station to initially configure said mobile station, said method comprising the steps of:

powering up said mobile station system;

detecting said powering up of said mobile station within a server coupled to said radio communication system;

sending a data message to said mobile station to enable said mobile station to make a data connection with said server;

establishing a data connection between said server and said mobile station;

sending authentication information from said mobile station to said server after a data connection is established between said server and said mobile station:

authenticating said mobile station in said server;

thereafter sending provisioning data containing initial operational parameters from said server to said mobile station;

interpreting said provisioning data within said mobile station to determine whether said provisioning data is relevant; and loading said initial operational parameters from said provisioning data into said mobile station when said mobile station determines that said provisioning data is relevant.

2. The method as claimed in claim 1 further comprising the steps of:

sending authentication information from said server to said mobile station when said server sends said provisioning data to said mobile station; and authenticating said server in said mobile station before said mobile stations sends and interprets said provisioning data.

3. The method as claimed in claim 2 further comprising the steps of:

sending a display message from said mobile station to a user interface of said mobile station to request a user of said mobile station to authorize loading said initial operational parameters into said mobile station; and waiting for said user to enter a user response; and interpreting said provisioning data within said mobile station to determine whether said provisioning data is relevant when said user response is positive.

4. The method as claimed in claim 3 further comprising the step of:

sending a failure message to said server when said mobile station determines that said user response is negative.

5. The method as claimed in claim 1 further comprising the step of:

sending a failure message from said mobile station to said server when said mobile station fails to authenticate said server.

6. The method as claimed in claim 1 further comprising the step of:

sending a commit message to said server when said mobile station determines that said provisioning data is relevant.

7. The method as claimed in claim 1 further comprising the step of:

sending a failure message to said server when said mobile station determines that said provisioning data is not relevant.

8. The method as claimed in claim 1 further comprising the steps of:

sending to said server a message from said mobile station indicative of a successful loading of said initial operational parameters from said provisioning data into said mobile station; and sending a message from said server to said mobile station acknowledging receipt of said message from said mobile station indicative of a successful loading of said initial operational parameters from said provisioning data into said mobile station.

9. The method as claimed in claim 1 further comprising the steps of:

sending to said server a message from said mobile station indicative of a failure to load said initial operational parameters from said provisioning data into said mobile station; and sending a message from said server to said mobile station acknowledging receipt of said message from said mobile station indicative of a failure to load said initial operational parameters from said provisioning data into said mobile station.

10. The method as claimed in claim 1 wherein said mobile station comprises one of: a cellular telephone, a vending machine, radio communication equipment that utilizes a Global System for Mobile Communications (GSM) module, and radio communication equipment that utilizes a Code Division Multiple Access (CDMA) chipset.

* * * * *